US007777919B2

(12) United States Patent
Malatesta

(10) Patent No.: US 7,777,919 B2
(45) Date of Patent: Aug. 17, 2010

(54) MODULAR DOCUMENT SORTING APPARATUS AND METHOD

(75) Inventor: James Malatesta, Hockessin, DE (US)

(73) Assignee: Tritek Technologies, Inc., Hockessin, DE (US)

( * ) Notice: Subject to any disclaimer, the term of this patent is extended or adjusted under 35 U.S.C. 154(b) by 268 days.

(21) Appl. No.: 12/038,490

(22) Filed: Feb. 27, 2008

(65) Prior Publication Data

US 2008/0144121 A1 Jun. 19, 2008

Related U.S. Application Data

(62) Division of application No. 10/359,375, filed on Feb. 6, 2003, now Pat. No. 7,361,861.

(60) Provisional application No. 60/354,886, filed on Feb. 6, 2002.

(51) Int. Cl.
*H04N 1/04* (2006.01)

(52) U.S. Cl. ....................... 358/448; 358/403; 358/497; 358/498

(58) Field of Classification Search ................. 358/448, 358/403, 497, 498
See application file for complete search history.

(56) References Cited

U.S. PATENT DOCUMENTS

| | | | | |
|---|---|---|---|---|
| 4,641,753 | A | 2/1987 | Tamada | |
| 5,226,547 | A | 7/1993 | Malatesta | |
| 5,291,002 | A | 3/1994 | Agnew et al. | |
| 5,398,922 | A | 3/1995 | Malatesta | |
| 5,464,099 | A | 11/1995 | Stevens et al. | |
| 5,518,122 | A * | 5/1996 | Tilles et al. | 209/539 |
| 5,521,365 | A | 5/1996 | Malatesta | |
| 5,544,758 | A | 8/1996 | Malatesta et al. | |
| 5,649,026 | A | 7/1997 | Heins, III | |
| 5,703,783 | A | 12/1997 | Allen et al. | |
| 2004/0078112 | A1 | 4/2004 | Barnum et al. | |

FOREIGN PATENT DOCUMENTS

| | | |
|---|---|---|
| EP | 0356228 | 2/1990 |
| EP | 0910038 | 4/1999 |
| WO | WO 93/02810 | 2/1993 |
| WO | WO 00/00300 | 1/2000 |
| WO | WO 02/10902 | 2/2002 |

OTHER PUBLICATIONS

Office Action dated Jul. 28, 2004 for U.S. Appl. No. 10/359,375.

(Continued)

*Primary Examiner*—Houshang Safaipour
(74) *Attorney, Agent, or Firm*—Schnader Harrison Segal & Lewis, LLP

(57) ABSTRACT

Methods using a modular document sorting apparatus are disclosed. A plurality of modules are functionally connected to one another to enable them to scan documents for information and sort the documents according to the scanned information. Each module performs at least one function. Functions can include, feeding documents into the apparatus, singulating documents, transporting documents through at least a portion of the apparatus, scanning documents, printing on documents and sorting documents according to scanned information. Each module may be powered by a separate power supply. A single on/off switch can control a plurality of modules.

21 Claims, 8 Drawing Sheets

OTHER PUBLICATIONS

Response to Jul. 28, 2004 Office Action dated Jan. 28, 2005 for U.S. Appl. No. 10/359,375.

Office Action dated Apr. 22, 2005 for U.S. Appl. No. 10/359,375.

Response to Apr. 22, 2005 Office Action dated Oct. 21, 2005 for U.S. Appl. No. 10/359,375.

Restriction Requirement dated Jan. 11, 2006 for U.S. Appl. No. 10/359,375.

Response to Jan. 11, 2006 Restriction Requirement dated Feb. 9, 2006 for U.S. Appl. No. 10/359,375.

Office Action dated May 15, 2006 for U.S. Appl. No. 10/359,375.

Response to May 15, 2006 Office Action dated Sep. 7, 2006 for U.S. Appl. No. 10/359,375.

Office Action dated Nov. 28, 2006 for U.S. Appl. No. 10/359,375.

Response to Nov. 28, 2006 Office Action dated May 29, 2007 for U.S. Appl. No. 10/359,375.

Restriction Requirement dated Aug. 16, 2007 for U.S. Appl. No. 10/359,375.

Response to Aug. 16, 2007 Restriction Requirement for U.S. Appl. No. 10/359,375.

Notice of Allowance and Fees Due dated Nov. 29, 2007 for U.S. Appl. No. 10/359,375.

* cited by examiner

MODULAR DOCUMENT SORTING APPARATUS AND METHOD

RELATED APPLICATION

This application claims priority to and is a divisional of U.S. Patent Application Ser. No. 10/359,375, having a filing date of Feb. 6, 2003, and entitled Modular Document Sorting Apparatus and Method, which claims priority to U.S. Provisional Patent Application Ser. No. 60/354,886, having a filing date of Feb. 6, 2002, and entitled Modular Document Sorting Apparatus and Method.

FIELD OF THE INVENTION

The present invention relates to document scanning and sorting, and is particularly applicable to mail sorting.

BACKGROUND OF THE INVENTION

Document sorting machines, such as those used by the United States Postal Service for mail, typically have very large footprints and run at high speeds. The high speeds require very costly imaging devices to scan documents for sorting purposes. The large footprint of the machines limits their use to facilities, which can accommodate their size.

Many documents processed through a sorting machine are not properly scanned or sorted. Refeeding them through the sorting machine usually results in the same outcome. Documents must then be processed by hand which is time consuming and subject to human error.

Accordingly there is a need for a document-sorting machine that can process documents not processed by other sorting machines. Additionally, there is a need for a system that can be housed in less space than many traditional sorting machines.

SUMMARY OF THE INVENTION

Embodiments of the invention include use of a modular document sorting apparatus and method, particularly applicable to mail sorting. In an illustrative embodiment, a plurality of modules is functionally connected to one another to enable them to scan documents for information and sort the documents according to the scanned information. Each module performs at least one function. Illustrative functions include, feeding documents into the apparatus, singulating documents, transporting documents through at least a portion of the apparatus, scanning documents, printing on documents and sorting documents according to scanned information. In an exemplary embodiment, each module is powered by a separate power supply. Embodiments of the invention include sorting, scanning or both with the modular document sorting apparatus.

DESCRIPTION OF THE DRAWINGS

The invention is best understood from the following detailed description when read with the accompanying drawings.

DETAILED DESCRIPTION OF THE INVENTION

Embodiments of the invention provide a modular document sorting apparatus of that may be used for a variety of applications. As used herein, documents include any items having information contained thereon that may be scanned and used for sorting. The shape and size of the documents are limited only by what the apparatus is capable of transporting and sorting. Illustrative document examples include mail, and letter and legal size paper. More specific document examples include applications, such as for credit cards and memberships that may require sorting based on applicant information. Any industry requiring document sorting based on scanned information contained in the document is likely to find the invention useful and cost effective.

In an exemplary embodiment, the modular document sorting apparatus includes a plurality of modules functionally connected to one another to scan documents for information and sort the documents according to the scanned information, or other information, such as document dimensions. As used herein "scan" includes any process by which an image may be converted to a form readable by electronic means such as a computer. An image is any variation in color or shade. Scanned information may be used to sort documents or guide other steps such as printing information. Use of scanned information for such functions may include comparing image information to one or more lookup tables, and use of neural networks including processing elements with learning capabilities.

Functional connections include mechanical and electrical connections. Advantageously, modules need not be hard wired to one another, but may be connected with plug-in type or quick release connectors such as stereo connectors. This facilitates simple relocation of the apparatus and reconfiguration of modules. Mechanical connections may include components to secure, at least temporarily, modules to one another, align modules, or any other mechanical connections necessary to allow the modules to operate to transport, scan and sort documents effectively.

Each module performs at least one function, but may perform any number of functions. Exemplary functions include feeding documents into the apparatus, singulating documents, transporting documents through at least a portion of the apparatus, scanning documents, printing on documents and sorting documents. One or more receptacles may be included into which sorted documents are directed.

The feeding function may include, for example, a gravity, vacuum or friction mechanism, or a combination thereof. The singulation function separates documents for processing one at a time. Vacuum and friction mechanisms may also be used to accomplish this function, as well as other singulation mechanisms. The particular singulation mechanism used will depend in part on the type of document being processed.

Figure 1:
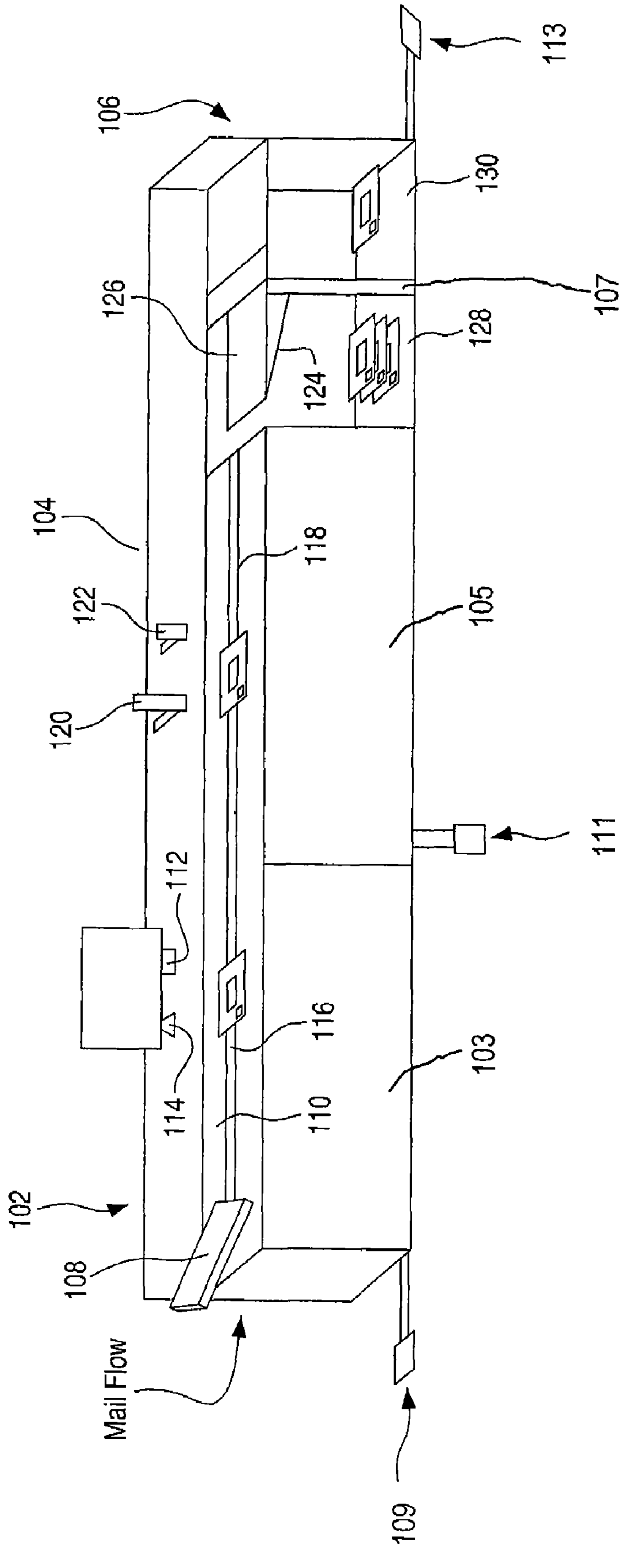
FIG. 1 depicts a modular document sorting apparatus according to an illustrative embodiment of the invention.

FIG. 1 depicts a modular document sorter according to an illustrative embodiment of the invention. Module 102 includes the following functions: Document feeding, document singulation and document imaging. Document feeding may be performed, for example, by a friction feeder 108. Singulator 110 performs the singulation function. A camera 112 is used for imaging. A lamp 114 may be included to enhance imaging. Module 102 also performs a portion of the document transport function in part by use of belt 116.

Module 104 shown in FIG. 1, also provides a portion of the transport function via belt 118. In addition, module 104 performs a printing function using printer 120. A camera 122 may be used to verify that the printing function was properly performed and/or that the documents are progressing through the apparatus properly. Transport section size is at least in part dependent on computer speed. As speed increases, transport length can be decreased.

In this exemplary embodiment, module 106 performs a sorting function using diverter gate 124 which can operate, for example, via solenoid 126. Module 106 includes a reject bin 128, and a bin 130 for properly processed documents. Additional sorting systems may be included, allowing items to be sorted in more receptacles.

Documents may be transported by any mechanism that moves the documents through the apparatus while allowing the documents to be scanned. The transport mechanism should be compatible with the sorting mechanism. Preferably documents are moved in a continuous manner with a predetermined spacing maintained between consecutive documents.

Figure 2:
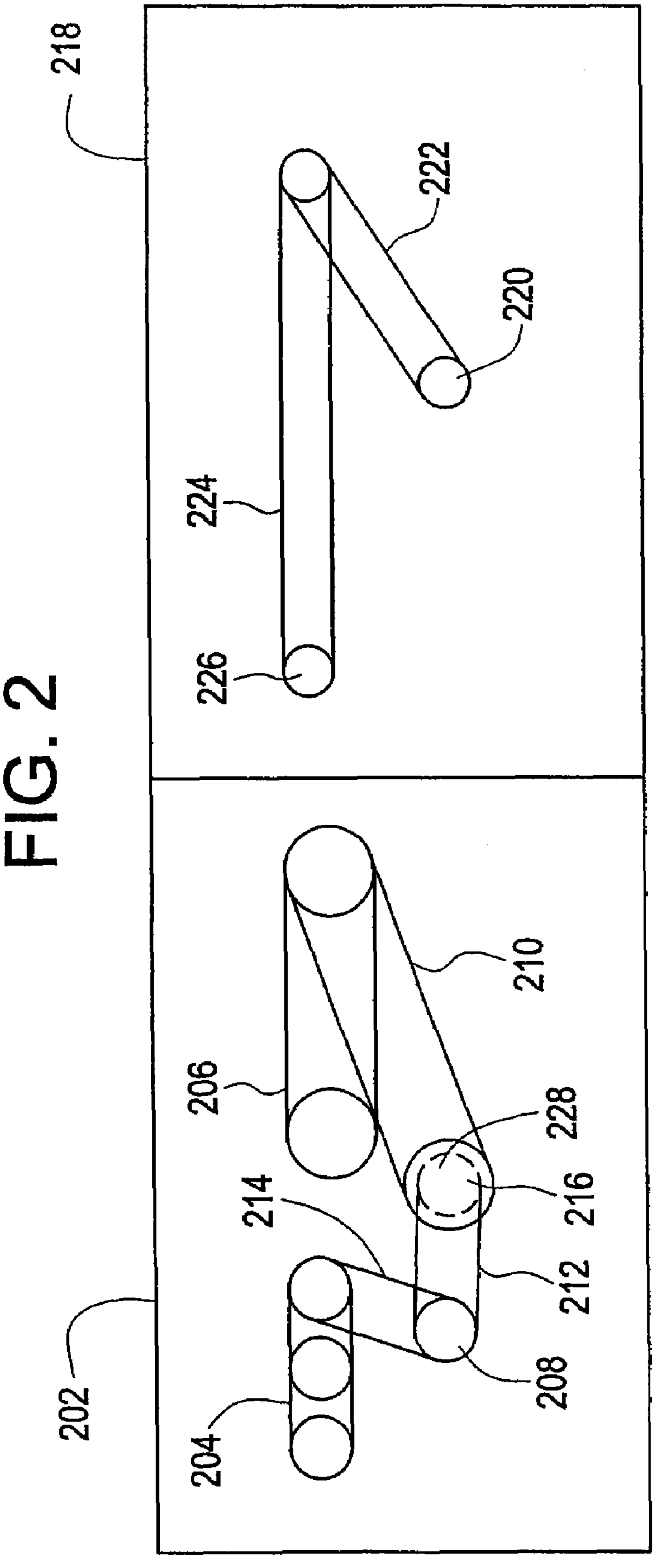
FIG. 2 depicts modular document sorting apparatus according to a further illustrative embodiment of the invention.

In an illustrative example, the transporting function is accomplished as shown in FIG. 2. FIG. 2 depicts a portion of a document sorting apparatus including modules 202 and 218. Module 202 accomplishes feeding and transport functions. A motor 216 drives belts 210, 212 and 214 around at least a portion of rollers 208. Drive belts 210, 212 and 214 drive transport belts 204 and 206 around additional rollers 208. Module 218 provides additional transport functions, for example to pass documents through a printer. Motor 220 drives belt 222 that in turn drives belt 224 on rollers 226. Each function of the apparatus does not need to be performed using a separate motor. A single motor may drive more than one mechanism so that, for example, the feeder and transport systems are driven by a single motor.

FIG. 2 also depicts a singulation function according to an illustrative embodiment of the invention. A step pulley 228 includes two pulleys having different diameters. The smaller diameter pulley runs belt 212, and the larger diameter pulley runs belt 210. This causes belt 206 to run slower than belt 204, thereby separating or creating a gap between documents. In an exemplary embodiment, the pulley diameters are in a ratio of 2:1. More generally, any transport surfaces moving documents at different speeds, that each can propel them in the desired direction, can be used to separate documents.

Documents are scanned for information at one or more locations on the apparatus. The scanned information is input to a computer. At least a portion of the scanned information is used for sorting and may be electronically stored either temporarily or permanently. Additional scanned information may be stored and/or applied to functions other than sorting. For example, a module may contain a printing function that can use scanned information to instruct a printer. The scanning function can include recognition capabilities such as alphabet, numeral, handwriting, symbols and other markings.

In an illustrative embodiment of the invention, the speed that documents move through the apparatus may be varied. The speed for each module may be adjusted separately or by a single adjustment. One or more speed checking devices may be incorporated into the system. A warning or shut-off mechanism may be functionally connected to the speed checking devices which would be triggered in the event that the speed varied from a desired value or range. A slower speed allows a document to be processed for a longer time. This can provide longer time between imaging and a decision is made on the scanned information, such as print/no print, accept/reject. In an exemplary embodiment there is a decision time in the range of about 0.5 seconds to about 1.5 seconds. A further illustrative range is between about 0.8 seconds and 1.2 seconds. Slower throughput rates allow more actions to be taken by a scanner. Slower speeds may be advantageous because higher quality recognition software often takes longer to capture an image. Slower speeds can also allow more time for tasks such as image compression and information storage on a computer hard disk.

The printing function may be used, for example, to apply a bar code or other identifying or routing information on a document. This has applications for mail items and other documents that need to be distributed or sorted.

In an illustrative embodiment of the invention, a plurality of power supplies is used, each to power a separate module. This may include separate power supplies for each module or power supplies that power more than one module, but not all. Additionally, more than one power supply may be used to power a single module. This may be advantageous if a module performs more than one function.

Figure 3:
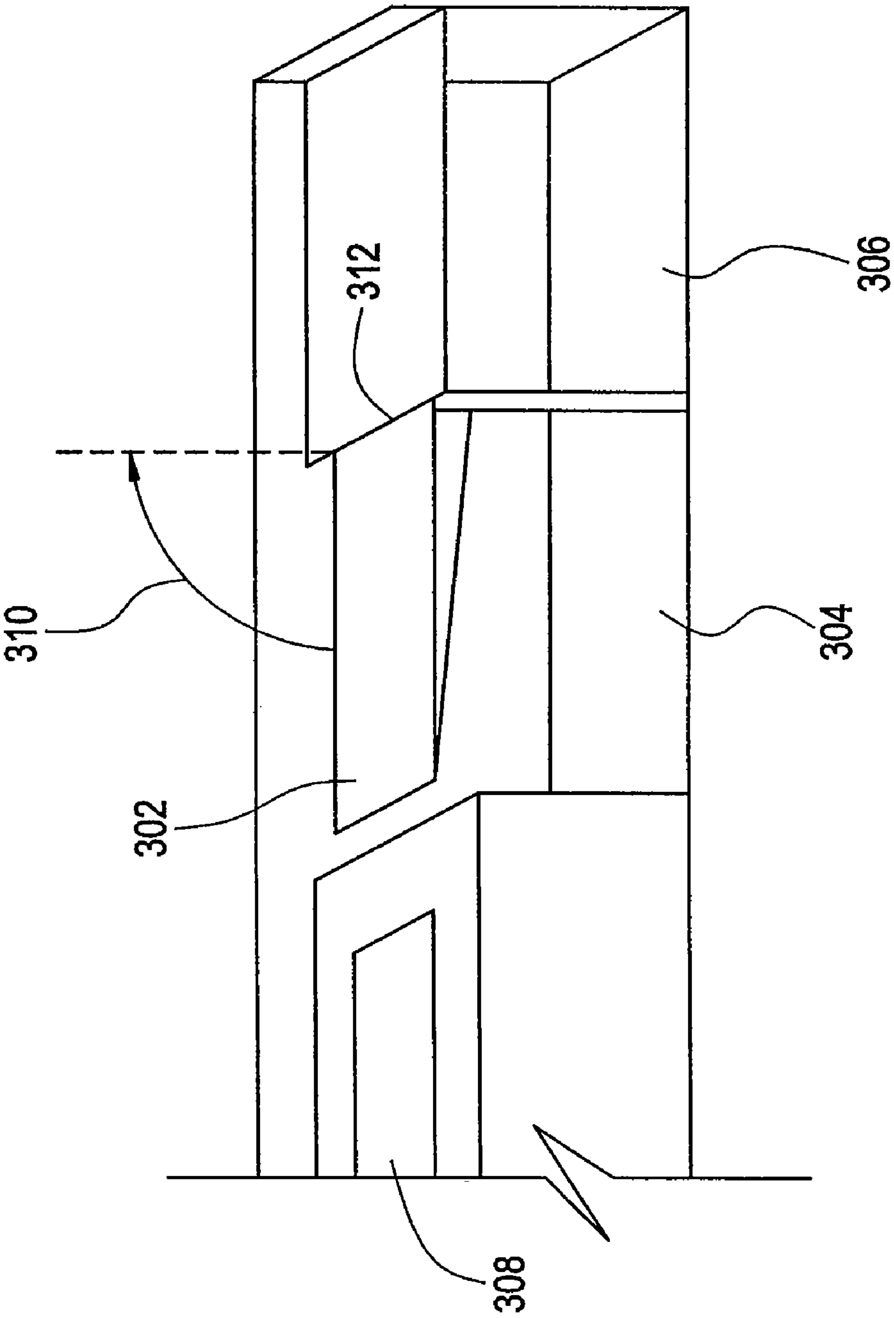
FIG. 3 depicts a diverter gate according to an illustrative embodiment of the invention.

FIG. 3 depicts an illustrative diverting mechanism. Embodiments of the invention include a diverting mechanism such as a gate, or other document direction-controlling component. Diverter gate 302 pivots to direct documents being transported by belt 308 into either of bins 304 or 306. Pivot angle 310 can be any angle sufficient in size to allow documents to pass into bin 304. Preferably pivot angle 310 is approximately 90° to allow maximum room for documents to enter bin 304. Diverter gate 302 is shown in FIG. 3 pivoting upward, however, diverter gate 302 may pivot downward. Preferably the diverter gate surface is a smooth, lightweight material, to facilitate movement of documents to bin 306 and gate movement. This illustrative diverter gate design uses gravity to stack documents, thereby reducing the number of belts in the system. This may simplify the design and reduce manufacturing costs.

It is noted that the gate depicted in FIG. 3 is particularly suitable for processing documents that lay flat on the apparatus. The invention also includes apparatus capable of processing documents transported on edge, meaning other than parallel to a transport belt. The type of diverting mechanism used will depend in part on the position of documents with respect to components of transport mechanisms. For example, a diverter may have to pivot from side to side as opposed to up and down to process edge fed mail.

In lieu of bin 306, a slide may be extended, for example from the vicinity of diverter gate edge 312. The slide may direct documents to a bin or additional sorting area. Documents may be directed to other diverter gates or conveyors.

Conventional document sorters typically have controller boards at each sorting or diverting section. A computer directs each controller board that may in turn direct subsequent controller boards. In an exemplary embodiment, the diverting mechanism is controlled directly by a computer as opposed to using a controller board or other processor to manage access to a computer. The ability to eliminate intermediate processors simplifies the apparatus design compared to conventional designs. The diverter may be positioned, for example, by a solenoid. The apparatus may include a single diverting mechanism, for example having a reject/accept type function, or a plurality of diverting mechanisms may be incorporated.

Switches can be incorporated to turn on and off modules or module functions. In an exemplary embodiment, a single switch turns on and off all modules. A switch or switches may also be incorporated to pause the apparatus or a portion thereof. Switches may be manually or automatically triggered.

Figure 4A:
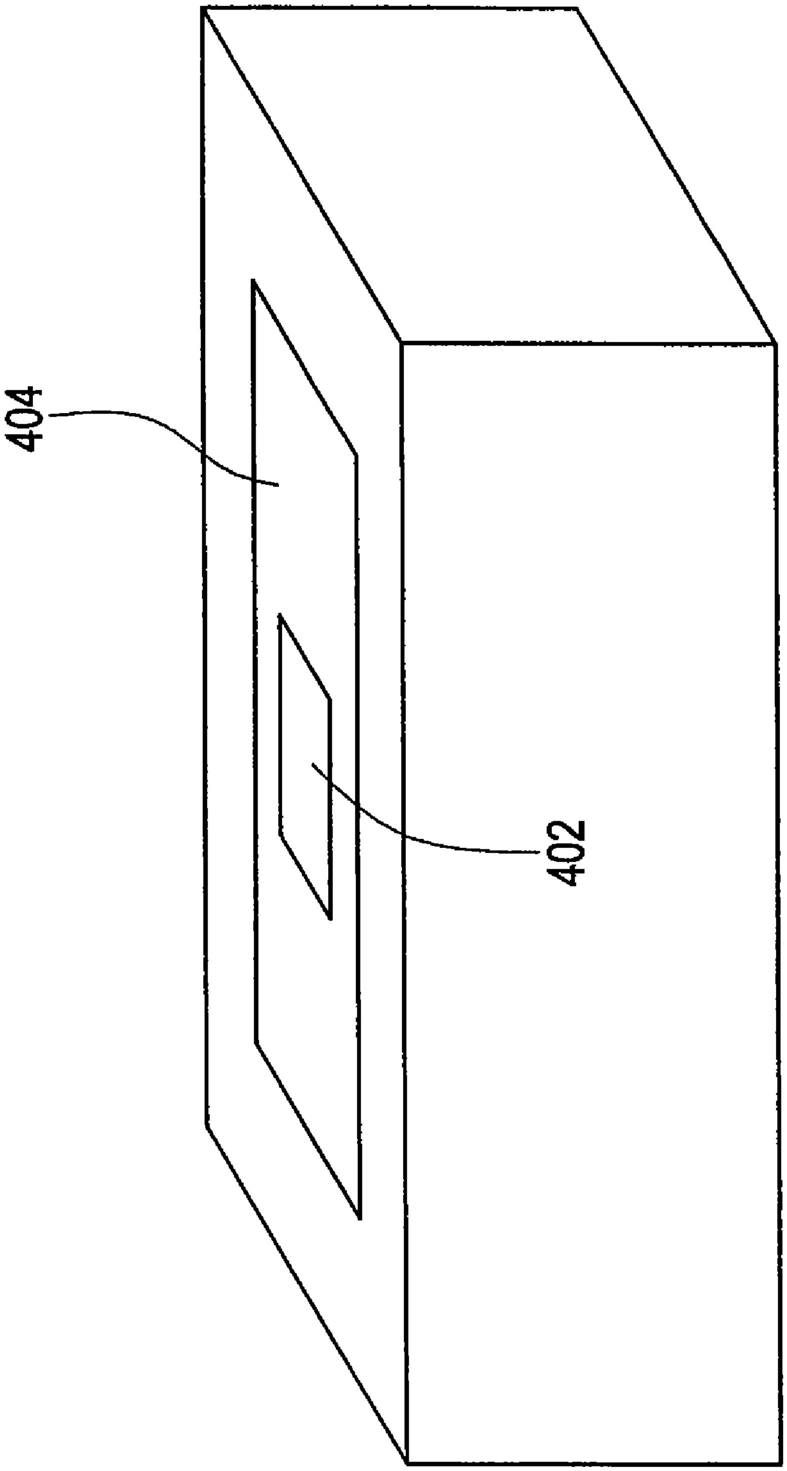
FIGS. 4A-C depict document transporting positions according to illustrative embodiments of the invention.
Figure 4B:
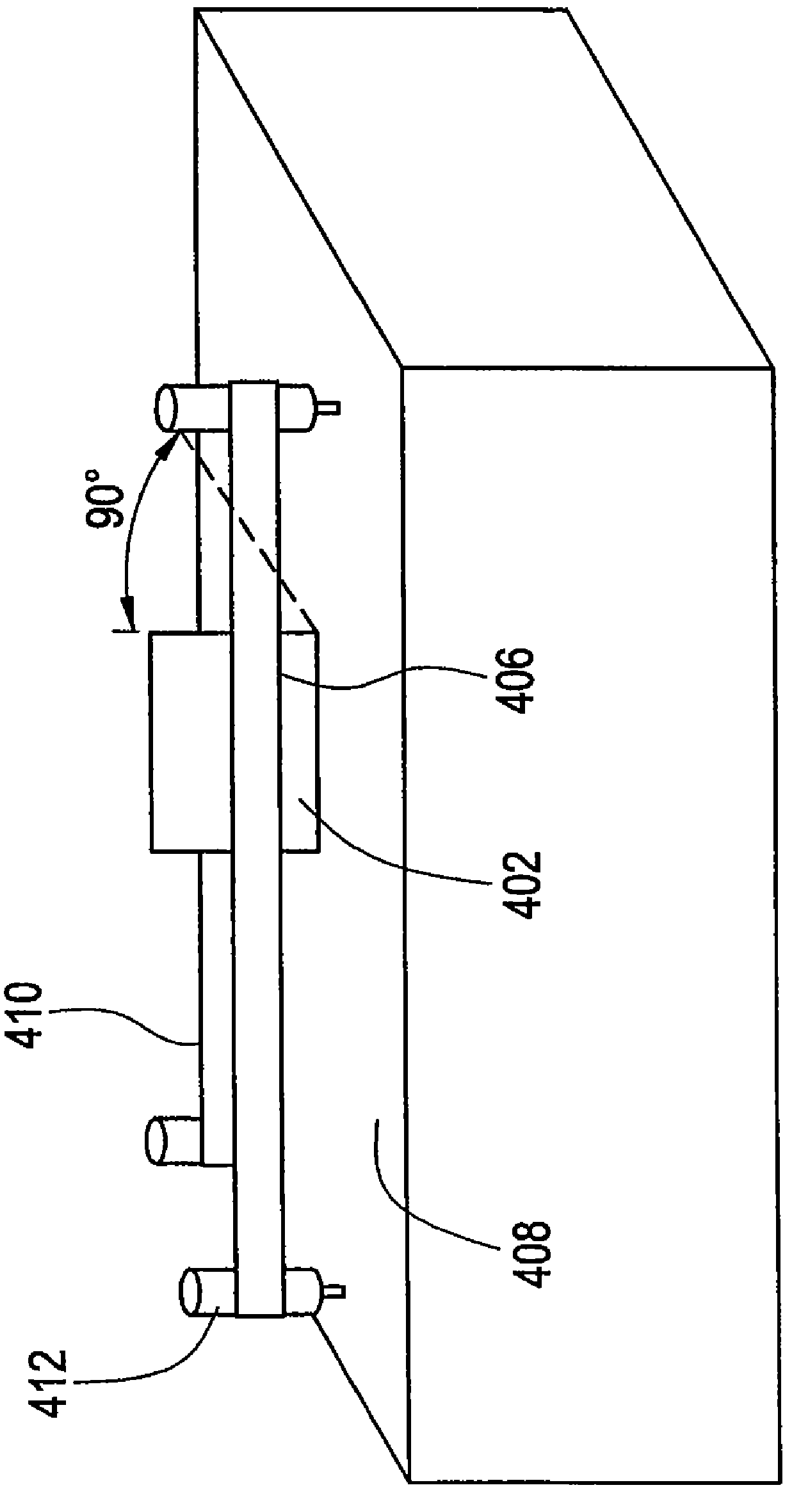
Figure 4C:
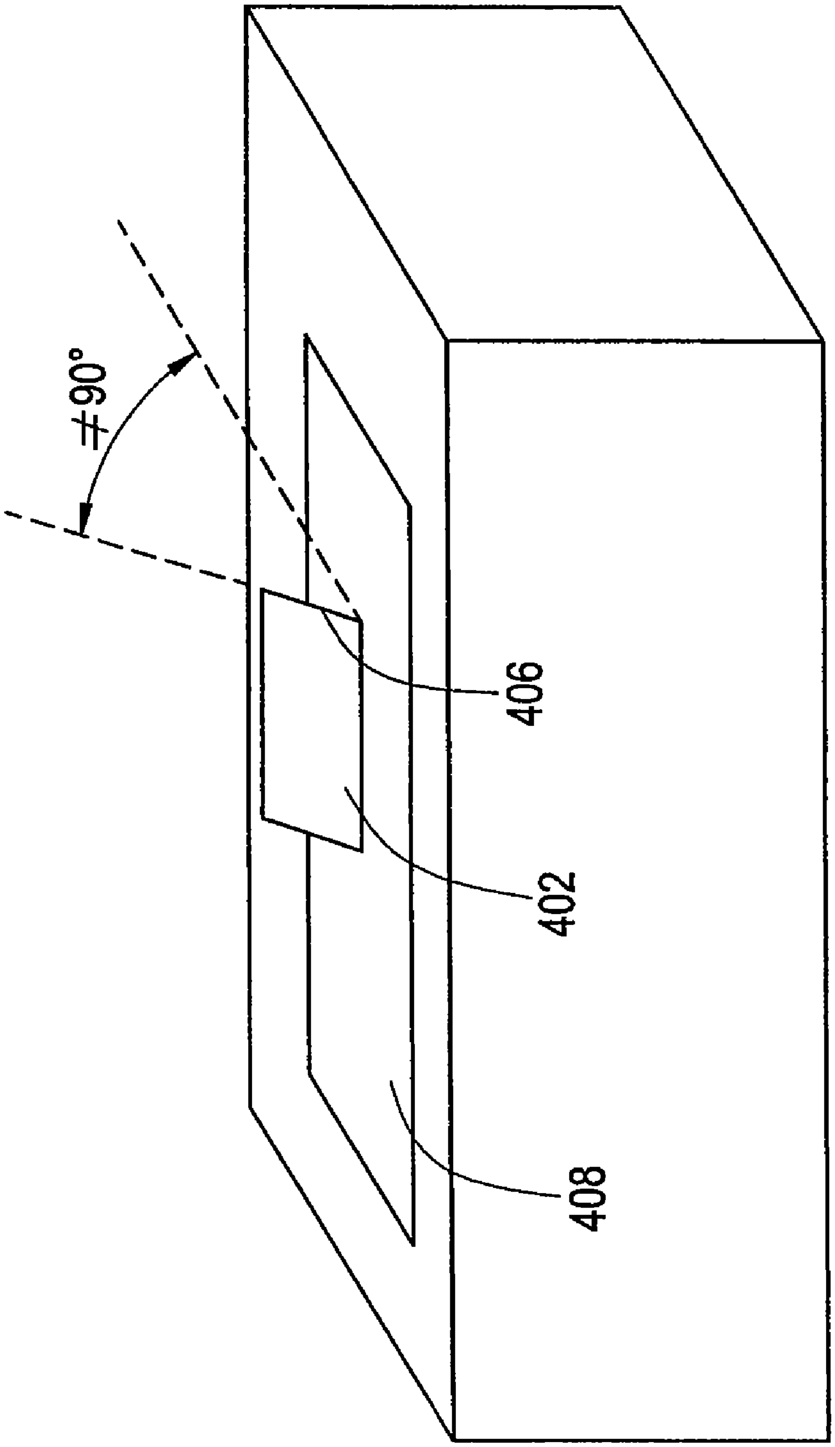

As provided above, documents may be fed into and transported through the apparatus in a flat manner, on edge or at an angle as depicted in FIGS. 4A-C. By "flat manner" it is meant that a document will have a face, as opposed to an edge, substantially parallel the ground. For example, a document 402 may be lying flat on a transport belt 404 as depicted in FIG. 4A. FIG. 4B depicts a document "on edge". A document "on edge" will have an edge 406 substantially perpendicular to a surface 408. A document on edge may positioned and moved, for example, by belts 410 rotating around roller 412. As shown in FIG. 4C a document "at an angle" will have edge 406 at an angle other than 90° to surface 408. For many applications, a flat manner transport will most effectively facilitate scanning and printing.

Modules may be equipped with wheels to allow easier movement and positioning. Preferably a mechanism is included to restrict movement once the module is positioned as desired. This may be a mechanism such as a brake applied to one or more wheels or to the ground. Mechanisms other than wheels may be employed to facilitate movement of the modules, such as a relatively slippery surface to allow the modules to be easily slid into position. Modules may also be secured to one another, either by quick release mechanisms, or more permanent devices such as bolts.

One or more sensors may be incorporated into the document sorting apparatus to monitor functioning of the apparatus and cause the apparatus to respond appropriately to perceived improper functioning. For example, a sensor may be functionally connected to a diverter. The sensor determines whether space between documents is within a predetermined range, and causes the diverter to direct documents not spaced within the predetermined range to a reject area such as a bin. Document spacing information may include document size information. Thus another sorting criteria can be document dimensions.

Figure 5:
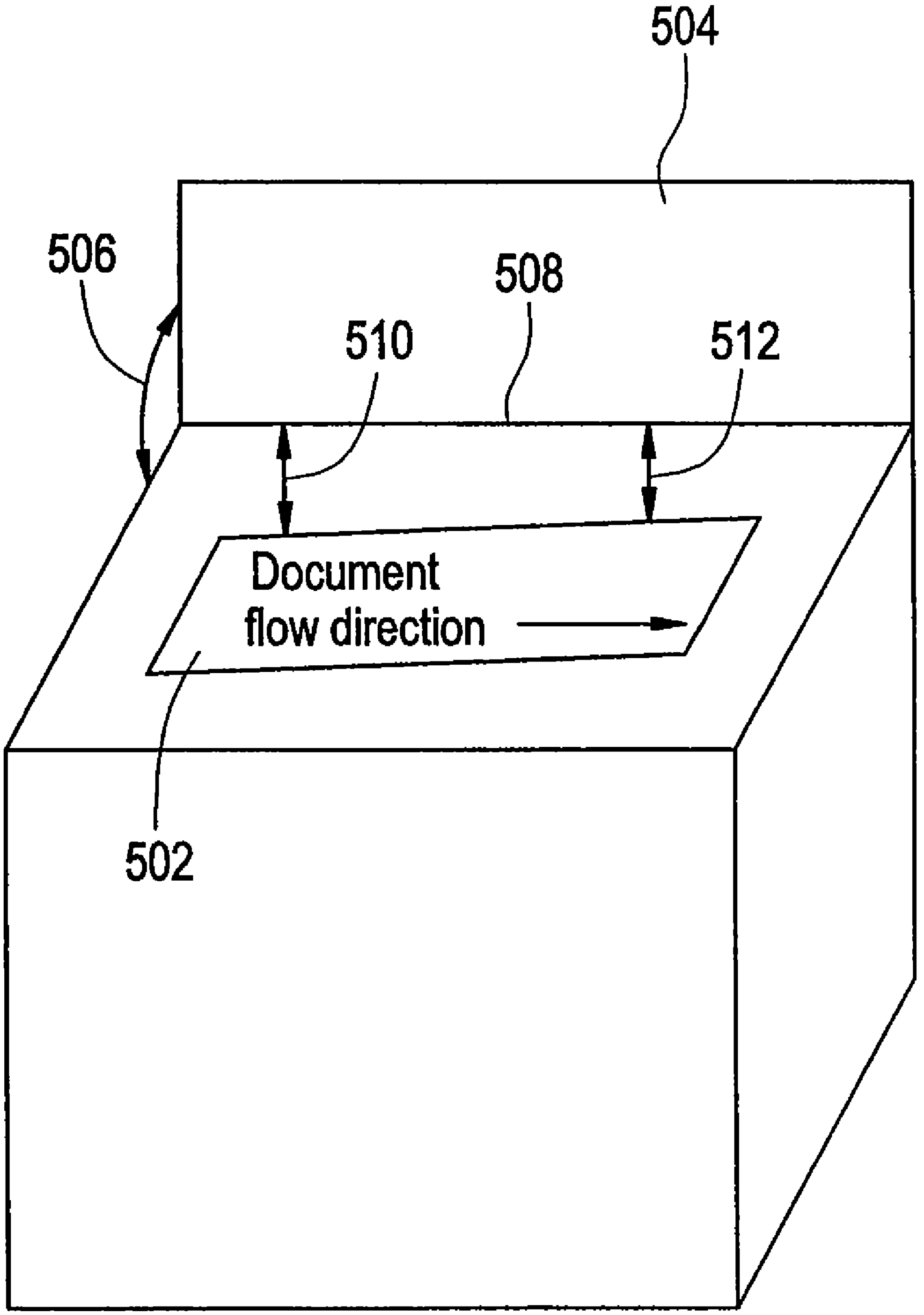
FIG. 5 depicts an alignment mechanism according to an illustrative embodiment of the invention.

Alignment of documents in the system is important, particularly for scanning and printing. An alignment mechanism can be incorporated to assure that documents are positioned properly for scanning and printing. An illustrative alignment mechanism is depicted in FIG. 5. The mechanism includes a belt 502 or other transport surface, by which documents may be transported, preferably lying substantially flat on the belt, with a wall 504 at an angle 506 to surface 514 and spaced a distance away from belt 502. Wall 504 has a lower longitudinal edge 508, wherein the space between lower edge 508 and belt 502 decreases in the direction of document movement such that the documents are guided toward lower edge 508 of the wall 504, and thus aligned therewith. For example, as shown in FIG. 5, distance 510 is greater than distance 512. Other mechanisms that guide documents toward wall 504 are within the scope of the invention. The apparatus is configured so that when documents are aligned with the wall, they are also aligned with any scanner, sensor, printer or other device that requires a particular document position. A mechanism of this sort may also be helpful in assuring a repeatable positioning for carrying out functions such as scanning and printing.

In a further embodiment of the invention, the sorting apparatus is controlled by a transport computer and an imaging computer. The transport computer may govern image capturing, document transport and document sorting. The imaging computer may process image information to determine sorting requirements or other use of scanned information.

Figure 6:
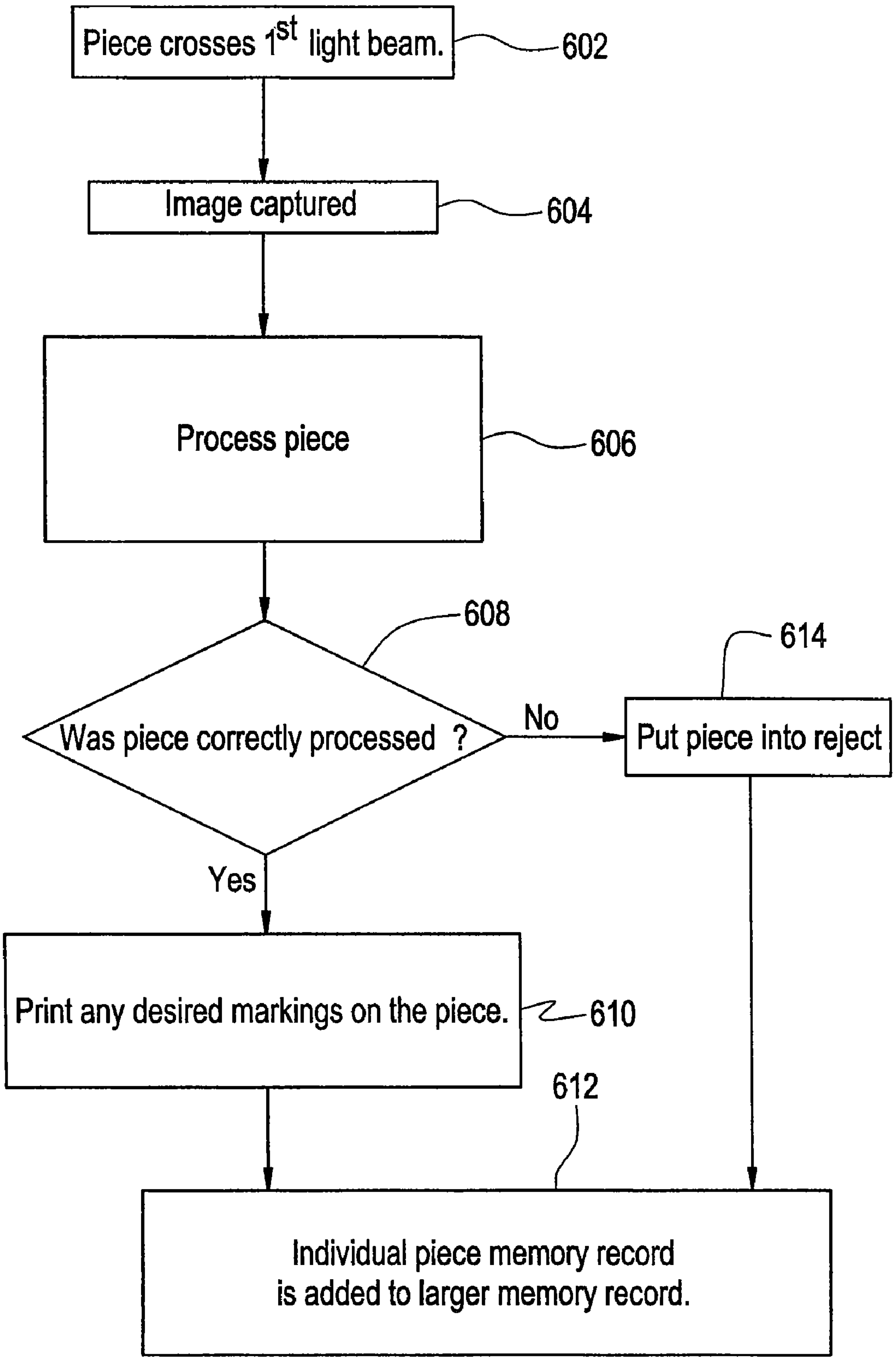
FIG. 6 depicts a flow chart of a document sorting process according to an illustrative embodiment of the invention.

Embodiments of the invention further include a method of sorting documents using a modular sorting apparatus. Documents are scanned for information and sorted according to the scanned information. Documents may also be analyzed for size information and sorted accordingly. Scanned or other gathered information may also be used to guide other functions of the modular sorting apparatus, or may be stored for other purposes. FIG. 6 depicts a flowchart of a document sorting processing according to an illustrative embodiment of the invention. A document crosses a first light beam in block 602. An image of the document is captured in block 604. In block 606, information generated by capturing the image in block 604 is used to further process the document. For example, an address can be located and read from a mail item, and a delivery point code can be determined based on the address. Other tasks may include reading a key line on a mail item, reading a bar code or storing the image in a digital file. In block 608, a determination is made as to whether the document was processed correctly. If the document was not processed correctly, the document is forwarded to a reject bin in block 614. Information regarding sending the document to the reject bin can be recorded either temporary or permanently in memory in block 612. A relevant report may be generated using this information. If in block 608 it is determined that the piece was correctly processed, then in block 610, markings may be printed on the document. For example, address information captured may be used to determine and print a postal code or bar code. A unique number, time/date stamp, operator identifier, or a mark merely indicating that the document has been successfully processed may be applied. The correctly processed document can be forwarded to a bin separate from the reject bin. Information regarding the properly processed document can be put in memory in block 612. Information regarding a particular document may be added to a larger memory record. A larger memory record may be used for example to produce reports. If used for example for mail sorting, lists of barcodes read, list of key line items on mail pieces, and/or the number of items processed may be produced.

Additional illustrative examples of uses of embodiments of the invention and further detail of uses follow. Embodiments of the invention may be used to read addresses and determine delivery point codes for mail items. This is an operation that allows users to get mailing discounts from the United States Postal Service.

Mail items sometimes contain a key line. The key line contains information such as account number, identification number or mailing number. Embodiments of the invention may be used, for example by health insurance customers who may want to confirm that a document for a particular account is about to be mailed and that the envelope is properly filled. By running all envelopes through embodiments of the invention, accurate records may be generated.

Credit card companies often use key lines on mail items. A credit card company may use embodiments of the invention to read key lines from mail items returned from the United States Postal Service so that address corrections may be made.

Contest companies may insert key lines on mail pieces then track them using embodiments of the invention to determine their most effective advertising technique and determine what responses have been received.

Embodiments of the invention may also be used to read bar codes or other machine printed markings by proxy counting companies who need to know who responded to proxy requests.

Images of entire documents may be captured and stored for later examination. Images may be stored, for example in gray scale or as black and white images.

While the invention has been described by illustrative embodiments, additional advantages and modifications will occur to those skilled in the art. Therefore, the invention in its broader aspects is not limited to specific details shown and described herein. Modifications, for example, to the functions contained on each module, the configuration of the modules, sorting, feeding and transporting mechanisms, and the type of documents being sorted, may be made without departing from the spirit and scope of the invention. Accordingly, it is intended that the invention not be limited to the specific illustrative embodiments, but be interpreted within the full spirit and scope of the appended claims and their equivalents.

The invention claimed is:

1. A method of processing documents comprising:

providing a modular document sorting apparatus having:

a plurality of modules functionally and releasably connected to one another to scan documents for information and sort the documents according to the information, the plurality of modules including a scanning module;

a sorting module for sorting documents according to scanned information;

wherein at least one of the plurality of modules includes a document feeder at least one of the plurality of modules includes a document singulator; and at least one of the plurality of modules includes at least one transport belt, the width of which is disposed substantially horizontally such that documents when carried on the at least one belt are transported in a flat manner on the at least one transport belt;

wherein two or more modules are configured to be powered by separate power supplies; and wherein the apparatus is controlled by a transport computer and an imaging computer;

wherein the transport computer governs image capturing, document transport and document sorting;

wherein the imaging computer processes image information to determine sorting requirements;

the apparatus stores images;

such that the apparatus can operate by releasing one or more modules not necessary for either scanning or sorting when scanning or sorting; and choosing to scan, sort or both with the modular document sorting apparatus by using the apparatus as configured; or releasing one or more modules not necessary for either scanning or sorting to choose between scanning or sorting documents.

2. The method of claim 1 wherein one or more modules are released such that the apparatus can operate to sort documents.

3. The method of claim 1 wherein one or more modules are released such that the apparatus can operate to scan documents.

4. The method of claim 1 comprising:

positioning the documents substantially flat on the transport surface.

5. The method of claim 1 comprising sorting the documents by dimension.

6. The method of claim 1 comprising:

spacing apart documents by providing at least one module with a plurality of transport surfaces wherein at least two adjacent transport surfaces move at different speeds causing documents thereon to move at different speeds.

7. The method of claim 1 comprising:

providing at least one modules having a printing function; and printing on one or more documents based on the information obtained from the documents.

8. The method of claim 1 comprising:

controlling one or more diverter gates directly by a computer to sort the documents.

9. The method of claim 1 comprising:

storing the scanned information permanently.

10. The method of claim 1 comprising:

storing the scanned information temporarily.

11. The method of claim 1 comprising:

reading handwritten material from the document as part of the scanning function.

12. The method of claim 1 comprising:

providing one or more sensors on one or more modules, each sensor functionally connected to a diverter;

sensing with the sensors whether space between documents is within a predetermined range thus causing the diverter to direct documents not spaced within the range to a reject area.

13. The method of claim 1 comprising:

providing a document alignment mechanism in at least one of the modules;

aligning the documents using the documents alignment mechanism.

14. The method of claim 13 wherein the alignment mechanism comprises a transport surface on which the documents are transported lying substantially flat on the transport surface, a wall adjacent to the transport surface and spaced a distance away from the transport surface, the wall having a lower longitudinal edge, wherein the space between the lower edge of the wall and the transport surface decreases in the direction of document movement such that the documents are guided toward the lower edge of the wall.

15. The method of claim 1 comprising:

providing one or more speed checking devices on one or more of the modules; and checking document speed.

16. The method of claim 1 comprising:

performing the document feeding function by a vacuum feeder.

17. The method of claim 1 comprising:

performing the document feeding function by a gravity feeder.

18. The method of claim 1 comprising:

processing image information by comparing image information to one or more lookup tables.

19. The method of claim 1 comprising:

providing a neural network as at least a part of the imaging computer.

20. The method of claim 19 comprising:

processing elements with learning capabilities via the neural network.

21. The method of claim 1 comprising:

sorting documents by address.

* * * * *